(12) United States Patent
Meiri et al.

(10) Patent No.: US 10,996,898 B2
(45) Date of Patent: May 4, 2021

(54) STORAGE SYSTEM CONFIGURED FOR EFFICIENT GENERATION OF CAPACITY RELEASE ESTIMATES FOR DELETION OF DATASETS

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 65 days.

(21) Appl. No.: 15/991,018

(22) Filed: May 29, 2018

(65) Prior Publication Data
US 2019/0369875 A1 Dec. 5, 2019

(51) Int. Cl.
*G06F 3/06* (2006.01)
*H04L 29/08* (2006.01)
(Continued)

(52) U.S. Cl.
CPC .............. *G06F 3/067* (2013.01); *G06F 3/061* (2013.01); *G06F 3/0608* (2013.01);
(Continued)

(58) Field of Classification Search
CPC ........ G06F 3/067; G06F 3/061; G06F 16/137; G06F 3/0608; G06F 3/0683;
(Continued)

(56) References Cited

U.S. PATENT DOCUMENTS 7,444,464 B2  10/2008  Urmston et al.
8,095,726 B1   1/2012  O'Connell et al.
(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Sanjiv Shah
*Assistant Examiner* — Edward Waddy, Jr.
(74) *Attorney, Agent, or Firm* — Ryan, Mason & Lewis, LLP

(57) ABSTRACT

A storage system in one embodiment comprises a plurality of storage devices and an associated storage controller. The storage controller is configured to identify a dataset to be scanned to generate a capacity release estimate for prospective deletion of that dataset, to designate a content-based signature prefix to be utilized in the scan, and to scan logical address mapping information for the dataset to identify one or more pages of the dataset that have the designated content-based signature prefix. The scanning further comprises, for each such identified page, determining a reference count of the page, and responsive to the reference count of the page having a particular value, determining a compressibility measure for the page. The storage controller generates the capacity release estimate for prospective deletion of the dataset based at least in part on the one or more page compressibility measures determined as part of the scan.

20 Claims, 6 Drawing Sheets

(51) Int. Cl.
*H04L 29/06* (2006.01)
*G06F 16/13* (2019.01)
*G06F 16/901* (2019.01)

(52) U.S. Cl.
CPC .......... *G06F 3/0641* (2013.01); *G06F 3/0683* (2013.01); *G06F 16/137* (2019.01); *G06F 16/9014* (2019.01); *H04L 67/1097* (2013.01); *H04L 69/04* (2013.01)

(58) Field of Classification Search
CPC .............. G06F 3/0641; G06F 16/9014; H04L 67/1097; H04L 69/04
USPC .......................... 711/170, 206, E12.059, 158
See application file for complete search history.

(56) References Cited

U.S. PATENT DOCUMENTS

| | | | |
|---|---|---|---|
| 8,214,612 | B1 | 7/2012 | Natanzon |
| 8,301,593 | B2 | 10/2012 | Hoffmann et al. |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 2008/0279462 | A1 | 11/2008 | Celi, Jr. |
| 2009/0132955 | A1 | 5/2009 | Garg et al. |
| 2010/0174879 | A1* | 7/2010 | Pawar ................... G06F 3/0608 711/161 |
| 2010/0179941 | A1 | 7/2010 | Agrawal et al. |
| 2011/0071989 | A1* | 3/2011 | Wilson ................ G06F 16/1748 707/692 |
| 2012/0158670 | A1* | 6/2012 | Sharma ................ G06F 16/174 707/692 |
| 2012/0210095 | A1* | 8/2012 | Nellans ................... G06F 12/10 711/206 |
| 2012/0246436 | A1* | 9/2012 | Wang ..................... G06F 9/5016 711/170 |
| 2013/0325824 | A1 | 12/2013 | Shoens |
| 2014/0181016 | A1 | 6/2014 | Whitehead et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0123928 | A1* | 5/2017 | Smith ................. G06F 11/1435 |
| 2017/0192857 | A1 | 7/2017 | Meiri et al. |
| 2018/0074745 | A1* | 3/2018 | Harnik ................. G06F 3/0641 |
| 2019/0303490 | A1 | 10/2019 | Chen et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

U.S. Appl. No. 15/884,577 filed in the name of Zvi Schneider et al. on Jan. 31, 2018 and entitled "Storage System with Decoupling and Reordering of Logical and Physical Capacity Removal."

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

U.S. Appl. No. 15/793,121 filed in the name of David Meiri et al. on Oct. 25, 2017 and entitled "Opportunistic Compression of Replicated Data in a Content Addressable Storage System."

U.S. Appl. No. 15/662,708 filed in the name of Xiangping Chen et al. on Jul. 28, 2017 and entitled "Token-Based Data Flow Control in a Clustered Storage System."

U.S. Appl. No. 15/824,536 filed in the name of Christopher Sayles et al. on Nov. 28, 2017 and entitled "Storage System with Asynchronous Messaging between Processing Modules for Data Replication."

U.S. Appl. No. 16/037,050 filed in the name of Ying Hu et al. on Jul. 17, 2018 and entitled "Storage System with Multiple Write Journals Supporting Synchronous Replication Failure Recovery."

U.S. Appl. No. 16/253,793 filed in the name of Yuval Harduf et al. on Jan. 22, 2019 and entitled "Storage System with Data Consistency Checking in Synchronous Replication Using Active Snapshot Set."

* cited by examiner

| ADDRESS-TO-HASH MAPPING TABLE FOR DATASET *i* | | |
|---|---|---|
| LOGICAL ADDRESS OF PAGE | HASH 1 PREFIX | ADDITIONAL BYTES OF HASH 1 |
| LOGICAL ADDRESS OF PAGE | HASH 2 PREFIX | ADDITIONAL BYTES OF HASH 2 |
| ... | ... | ... |
| LOGICAL ADDRESS OF PAGE | HASH *n* PREFIX | ADDITIONAL BYTES OF HASH *n* |

STORAGE SYSTEM CONFIGURED FOR EFFICIENT GENERATION OF CAPACITY RELEASE ESTIMATES FOR DELETION OF DATASETS

FIELD

The field relates generally to information processing systems, and more particularly to storage in information processing systems.

BACKGROUND

In many storage systems, it is desirable to provide efficient release of storage capacity, for example, as such storage capacity becomes available due to deletion of storage volumes, in order to better accommodate the input-output (TO) processing demands of system users. However, conventional approaches to storage capacity release can be problematic. For example, in content addressable storage systems, multiple snapshots of a given storage volume or set of storage volumes may be maintained, and it can be difficult to determine which of the snapshots will be most beneficial to delete in terms of amount of storage capacity that would be released upon deletion of that snapshot. Conventional techniques for generating such capacity release estimates can require substantial computational and memory resources, thereby undermining system performance.

SUMMARY

Illustrative embodiments provide techniques for efficient generation of capacity release estimates for prospective deletion of snapshots and other datasets in a storage system. For example, one or more such embodiments can be advantageously configured to generate accurate capacity release estimates through utilization of designated content-based signature prefixes in scanning pages of a dataset. Such arrangements can considerably reduce the amounts of storage system computational and memory resources that are required to generate capacity release estimates, thereby leading to improved dataset deletion decisions and associated improvements in storage system performance.

These embodiments illustratively include a clustered implementation of a content addressable storage system having a distributed storage controller. Similar advantages can be provided in other types of storage systems.

In one embodiment, a storage system comprises a plurality of storage devices and an associated storage controller. The storage controller is configured to identify a dataset to be scanned to generate a capacity release estimate for prospective deletion of that dataset, to designate a content-based signature prefix to be utilized in the scan, and to scan logical address mapping information for the dataset to identify one or more pages of the dataset that have the designated content-based signature prefix. The scanning further comprises, for each such identified page, determining a reference count of the page, and responsive to the reference count of the page having a particular value, determining a compressibility measure for the page. The storage controller generates the capacity release estimate for prospective deletion of the dataset based at least in part on the one or more page compressibility measures determined as part of the scan.

The dataset illustratively comprises a particular point-in-time snapshot of a set of one or more logical storage volumes, with each of the logical storage volumes comprising at least a portion of a physical storage space of one or more of the storage devices.

In some embodiments, scanning logical address mapping information for the dataset to identify one or more pages of the dataset that have the designated content-based signature prefix comprises identifying an address-to-hash mapping table for the dataset, and traversing the address-to-hash mapping table to identify one or more entries each including a hash value having the designated content-based signature prefix.

The hash values in respective entries of the address-to-hash mapping table may comprise respective full or partial content-based signatures comprising hash digests of respective ones of the pages.

Additionally or alternatively, the hash values can comprise respective hash handles corresponding to respective content-based signatures of respective ones of the pages.

In some embodiments, a sampling ratio for the scan is established as a function of a length of the content-based signature prefix in bytes.

The designated content-based signature prefix illustratively comprises a specified number of initial content-based signatures bytes each having a designated value, such as a single byte having a designated value.

In some embodiments, generating the capacity release estimate for the dataset based at least in part on the one or more page compressibility measures further comprises computing a partial capacity release estimate based at least in part on multiple page compressibility measures used to determine compressed page sizes for respective ones of the pages, and scaling the partial capacity release estimate as a function of a sampling ratio to obtain the capacity release estimate for the dataset.

The storage controller may be further configured to generate one or more additional capacity release estimates for respective ones of one or more additional datasets, and to select a particular one of the datasets for deletion based at least in part on their respective capacity release estimates.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIG. 3 shows an example of an address-to-hash mapping table in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
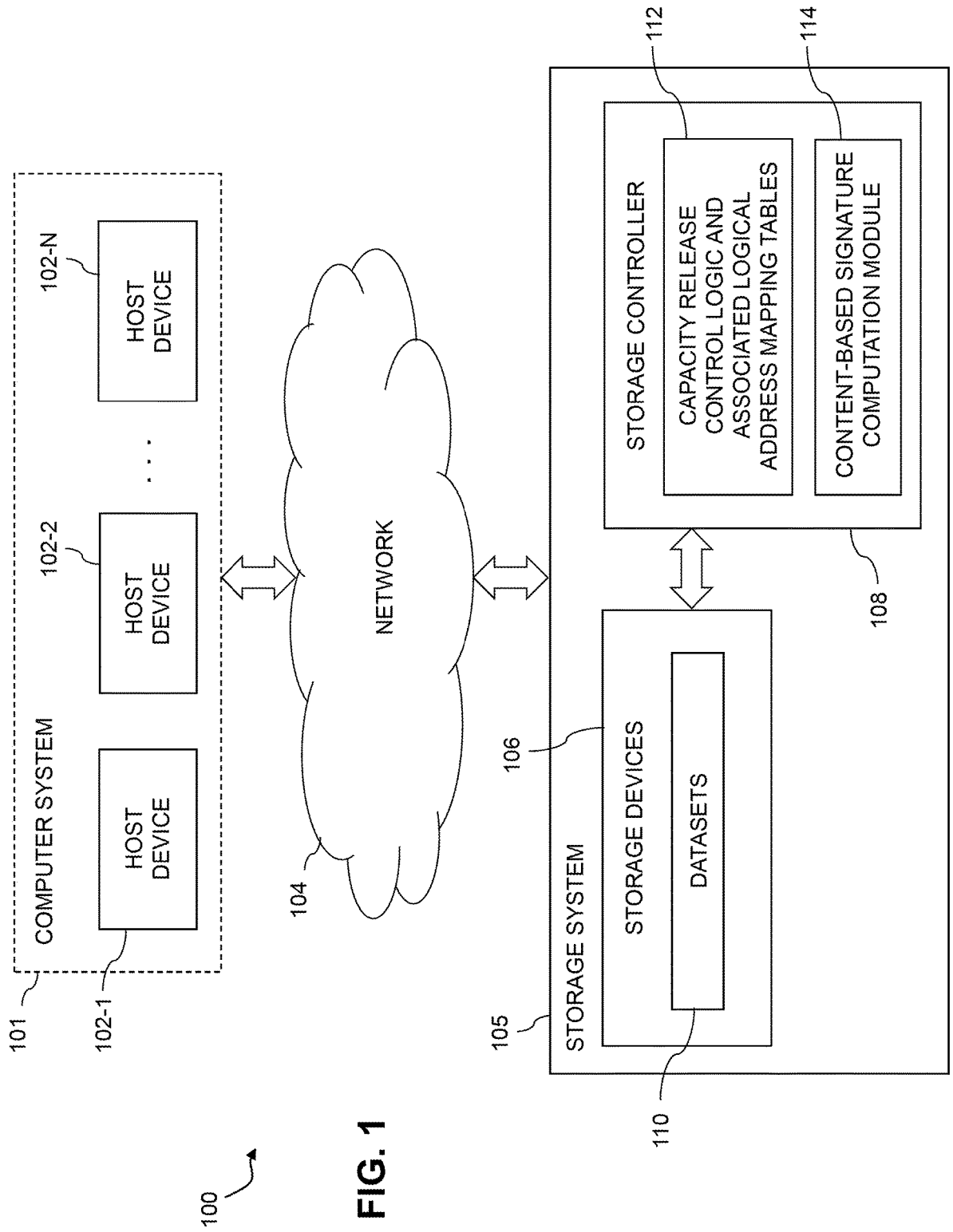
FIG. 1 is a block diagram of an information processing system comprising a storage system configured with functionality for efficient generation of capacity release estimates for deletion of datasets in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store datasets 110, which may comprise logical storage volumes, snapshots or other arrangements of data.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes capacity release control logic and associated logical address mapping tables, collectively represented by module 112. The capacity release control logic is configured to control performance of a capacity release estimate generation process such as that illustrated in the flow diagram of FIG. 2. The logical address mapping tables are maintained in a memory of the storage system 105 under the control of the capacity release control logic. An example logical address mapping table format will be described below in conjunction with FIG. 3. The storage controller 108 further comprises a content-based signature computation module 114. The storage controller 108 and storage system 105 should also be understood to include additional modules and other components typically found in conventional implementations of storage controllers and storage systems, although such additional modules and other components are omitted from the figure for clarity and simplicity of illustration.

The storage controller 108 via its capacity release control logic is configured to identify a dataset to be scanned to generate a capacity release estimate for prospective deletion of that dataset, to designate a content-based signature prefix to be utilized in the scan, and to scan logical address mapping information for the dataset to identify one or more pages of the dataset that have the designated content-based signature prefix.

The scanning further comprises, for each such identified page, determining a reference count of the page, and responsive to the reference count of the page having a particular value, determining a compressibility measure for the page. The storage controller 108 then generates the capacity release estimate for prospective deletion of the dataset based at least in part on the one or more page compressibility measures.

A given dataset to be scanned by the storage system 105 to generate a capacity release estimate illustratively comprises a set of one or more logical units (LUNs) or other logical storage volumes of the storage system 105. However, the term "dataset" as used herein is intended to be broadly construed, and may include other types and arrangements of data, including snapshots, or portions thereof.

For example, in some embodiments, it is assumed that the dataset comprises a particular point-in-time snapshot of a set of one or more logical storage volumes, with each of the logical storage volumes comprises at least a portion of a physical storage space of one or more of the storage devices 106.

The designated content-based signature prefix comprises a specified number of initial content-based signature bytes with the initial bytes each having a designated value. For example, the designated content-based signature prefix may comprise x initial content-based signature bytes having respective designated values $y_1, \ldots y_x$. In an arrangement of this type, the content-based signature prefix establishes a subspace corresponding to a fraction $$\frac{1}{256^x}$$

of the total scan space of possible content-based signature values. As the length of the prefix increases, the size of the subspace decreases.

The content-based signatures in many cases are substantially uniformly distributed over the total scan space of possible content-based signature values. As a result, the subspace established by the designated content-based signature prefix is also substantially uniformly distributed. The size of the subspace can be controlled in a straightforward manner by simply adjusting the length of the prefix as noted above.

The ratio of the subspace established by the content-based signature prefix to the total scan space of all possible content-based signatures more particularly provides a sampling ratio for the scanning process.

In some embodiments, the designated content-based signature prefix comprises just a single byte, or other numbers of bytes less than about four bytes, although other prefix lengths and configurations may be used in other embodiments.

The content-based signatures illustratively comprise hash digests of their respective pages, each generated by application of a hash function such as the well-known Secure Hashing Algorithm 1 (SHA1) to its corresponding page. It is also possible that other types of content-based signatures may be used, such as hash handles of the type described elsewhere herein. A given content-based signature in illustrative embodiments is unique to the particular content of the page from which it is generated, such that two pages with exactly the same content will have the same content-based signature, while two pages with different content will have different content-based signatures.

The logical address mapping information illustratively comprises an address-to-hash mapping table for the dataset. A more specific example of such an address-to-hash mapping table is referred to elsewhere herein as an A2H table, although it is to be appreciated that other types of address-to-hash mapping tables, or more generally logical address mapping information, may be used in other embodiments.

In some embodiments, scanning logical address mapping information for the dataset to identify one or more pages of the dataset that have the designated content-based signature prefix comprises identifying an address-to-hash mapping table for the dataset, and traversing the address-to-hash mapping table to identify one or more entries each including a hash value having the designated content-based signature prefix.

For example, the hash values in respective entries of the address-to-hash mapping table may comprise at least respective portions of corresponding content-based signatures comprising hash digests of respective ones of the pages.

As another example, the hash values in respective entries of the address-to-hash mapping table may comprise respective hash handles corresponding to respective content-based signatures of respective ones of the pages.

A more detailed example of an address-to-hash mapping table for a given dataset will be described below in conjunction with FIG. 3. This table may also be viewed as an example of what is more generally referred to herein as a logical address mapping table, which is a type of "logical address mapping information" as that term is broadly used herein.

As mentioned previously, the sampling ratio for the scan in some embodiments is a function of a length of the content-based signature prefix in bytes.

The reference count of a given page illustratively specifies a total number of pages that have the same content-based signature and that map via that same content-based signature to the same portion of a physical storage space of one or more of the storage devices 106 of the storage system 105. The reference count is illustratively maintained for its particular corresponding content-based signature rather than for each individual page. Such a reference count is also referred to herein as the reference count of a given page having that particular content-based signature. Pages having the same content-based signature will therefore have the same reference count.

The particular value of the reference count of the page that is utilized to control whether or not a compressibility measure is determined for that page illustratively comprises a reference count value of one. This is because an individual page having a reference count greater than one will generally not result in any capacity release if removed.

Accordingly, compressibility measures are determined in some embodiments only for those pages that have the designated content-based signature prefix in their respective content-based signatures, and have reference counts that are equal to one.

In some embodiments, determining a compressibility measure for the page comprises reading a stored compressibility measure generated in conjunction with a previous compression of the page. Alternatively, determining a compressibility measure for the page may comprise retrieving the page, compressing the page, and generating the compressibility measure based at least in part on the compressing. The compressibility measures illustratively comprise respective compression ratios. A given such compressibility ratio generally indicates a potential reduction in size of the corresponding page of the dataset if that page were subject to a compression operation.

Other types of compressibility measures can be used in other embodiments.

In some embodiments, the storage controller 108 is further configured to count, for each identified page having the designated content-based signature prefix and a reference count greater than one, the number of times that pages having that same content-based signature appear in the dataset. If the total number of times that pages having a particular content-based signature appear in the fully-scanned dataset is found to be the same as the reference count for that content-based signature, the content-based signature can be removed from the storage system in conjunction with deletion of all of its corresponding pages in the dataset. This is because under such a condition there will be no other pages with that particular content-based signature in any other datasets of the storage system.

The storage controller 108 may be configured to adjust an amount of computational or memory resources to be utilized in the scan of the dataset at least in part by altering a length of the designated content-based signature prefix.

For example, increasing the length of the designated content-based signature prefix will decrease the size of the subset of pages that will have content-based signatures matching the prefix. In other words, as the length of the prefix increases, it is less likely that any particular scanned page will have a content-based signature with an initial portion that matches the longer prefix, and so the subset of matching pages is reduced, meaning that the capacity release estimate will be based on a smaller number of matching pages.

As another example, the storage controller 108 can trade off accuracy of the capacity release estimate with the amount of computational or memory resources required to generate the estimate. For example, the storage controller 108 can select a length of the designated content-based signature prefix in order to achieve a rate of false positives in the capacity release estimate that is less than a specified maximum rate of false positives.

In some embodiments, generating the capacity release estimate for the dataset based at least in part on the one or more page compressibility measures further comprises computing a partial capacity release estimate based at least in part on multiple page compressibility measures used to determine compressed page sizes for respective ones of the pages, and scaling the partial capacity release estimate as a function of the sampling ratio to obtain the capacity release estimate for the dataset.

For example, the partial capacity release estimate can be generated by utilizing the compressibility measures of the identified pages having reference counts equal to one to determine a sum of the sizes of the corresponding compressed pages. The partial capacity release estimate is then scaled through multiplication by an inverse of the sampling ratio.

The capacity release estimate in some embodiments is in the form of an amount of storage capacity that would be released upon deletion of the dataset. Other types of capacity release estimates can be used in other embodiments, and such estimates therefore should not be viewed as limited to any particular estimate format.

Various automated actions may be taken in at least one of the host devices 102 and the storage system 105 based at least in part on capacity release estimates generated in the manner described above.

For example, the storage system 105 can adjust one or more characteristics of a storage configuration of a given dataset based at least in part on the capacity release estimate generated for the dataset. In the present embodiment, this can include deleting the dataset from the storage system 105, or copying the dataset from the storage system 105 to another storage system and then deleting it from the storage system 105.

As another example, the storage system 105 can generate multiple capacity release estimates for respective datasets, and select a particular one of the datasets for deletion based at least in part on their respective capacity release estimates.

The illustrative embodiments described above advantageously avoid the excessive consumption of computational and memory resources that could otherwise result if compressibility measures had to be determined for a large percentage of the pages in the dataset in conjunction with scanning the dataset.

For example, in an embodiment in which the storage system 105 comprises a content addressable storage system, a large number of snapshots may be stored, such that techniques for efficient generation of accurate capacity release estimates for respective snapshots are highly desirable. In a content addressable storage system without the efficient capacity release estimate generation functionality described above, it might be necessary to scan a full A2H table and compute compressibility measures for all or most of the pages, such as all of the pages having a reference count equal to one. Such an approach is computationally very expensive, and is avoided in illustrative embodiments disclosed herein.

These and other issues are addressed and overcome by the illustrative embodiments, which as described previously utilize a designated content-based signature prefix to establish a subspace of the total scan space. As noted above, utilizing a designated content-based signature prefix of length x bytes results in a scan subspace corresponding to a fraction $$\frac{1}{256^x}$$

of a total scan space of possible content-based signature values, which can be used to generate highly accurate capacity release estimates using substantially reduced amounts of computational and storage resources. The partial capacity release estimate for the subspace is scaled to infer the capacity release estimate for the full dataset.

In some embodiments, a process for generating a capacity release estimate in the system 100 includes the following operations:

1. Determine the size of the dataset to be scanned and what portion of the dataset should be sampled to provide an acceptable margin of error in the capacity release estimate.

2. Determine the size and value of the prefix for the desired sampling. For example, to establish a subspace that is a fraction ½₅₆ of a total scan space of possible content-based signature values, the prefix is a single byte having a particular value.

4. Scan the dataset to identify pages having the designated content-based signature prefix, and for each such identified page that also has a reference count equal to one, determine its compressibility measure.

5. Upon completion of the scan, a partial capacity release estimate is generated for the subspace by utilizing the compressibility measures of the identified pages having reference counts equal to one to determine a sum of the sizes of the corresponding compressed pages, and that result is scaled by the inverse of the sampling ratio to generate the capacity release estimate for the full dataset.

As indicated previously, a process of the type described above considerably reduces the computational and memory resources required to generate the capacity release estimate, while also maintaining a high level of accuracy.

For example, such arrangements overcome the disadvantages that would result by simply scanning ranges of logical addresses, as a given range of logical addresses is generally not representative of its entire dataset and additionally cannot accurately account for deduplication reduction in the entire dataset.

Another advantage of illustrative embodiments is that if a given content-based signature appears in the storage system only for pages in the particular dataset being scanned, the scan will be guaranteed to find all of the occurrences of that content-based signature and its corresponding pages in the sample space. The particular content-based signature can then be deleted from the storage system in conjunction with deletion of the dataset.

These and other operations carried out in conjunction with a process for generating capacity release estimates in the storage system 105 are illustratively performed at least in part under the control of the capacity release control logic of module 112. Such operations utilize the associated logical address mapping tables as well as content-based signatures generated for respective pages by the content-based signature computation module 114.

The host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106, storage controller 108 and datasets 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for capacity release estimate generation and associated automated processing based at least in part on the resulting capacity release estimates can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 2. The process as shown includes steps 200 through 218, and is suitable for use in system 100 but is more generally applicable to other types of information processing systems in which a storage system is configured to generate a capacity release estimate for a dataset and to take one or more automated actions based at least in part on the generated capacity release estimate. The steps are illustratively performed at least in part under the control of the capacity release control logic implemented in module 112 in storage system 105 of system 100.

In step 200, a dataset is identified. The identified dataset is a dataset to be scanned to generate a capacity release estimate for that dataset. The dataset is illustratively one of a plurality of datasets stored in a storage system, such as one of the datasets 110 stored in storage system 105 of system 100. The identified dataset illustratively comprises a set of one or more LUNs or other logical storage volumes of the storage system. As another example, the identified dataset can comprise a point-in-time snapshot of one or more logical storage volumes.

In step 202, a content-based signature prefix is designated to be utilized in the scan. The designated content-based signature prefix illustratively comprises a specified number of initial content-based signature bytes with the initial bytes each having a designated value. For example, the designated content-based signature prefix may comprise x initial content-based signature bytes having respective potentially-distinct designated values $y_1, \ldots y_x$ such that the prefix effectively establishes a particular subspace of a total scan space comprising all possible content-based signatures. The ratio of the subspace established by the content-based signature prefix to the total scan space of all possible content-based signatures more particularly provides a sampling ratio in the FIG. 2 process for the identified dataset.

In some embodiments, the designated content-based signature prefix comprises a particular number of initial content-based signature bytes, where the particular number is greater than or equal to one but less than four, although numbers in this range and other ranges referred to herein are only examples and should not be construed as limiting in any way. Different numbers of arrangements of bytes may be used in other embodiments.

Accordingly, other initial portions of a content-based signature may be used in illustrative embodiments. The term "content-based signature prefix" as used herein is therefore intended to be broadly construed. As another example, a portion of the signature comprising designated bytes, possibly excluding a first byte or a particular number of initial bytes, may also be used, and may nonetheless be considered a type of "content-based signature prefix" as that term is broadly used herein.

In step 204, logical address mapping information for the dataset is scanned. The logical address mapping information illustratively comprises an address-to-hash mapping table for the dataset. A more specific example of such an address-to-hash mapping table is referred to elsewhere herein as an A2H table, although it is to be appreciated that other types of address-to-hash mapping tables, or more generally logical address mapping information, may be used in other embodiments.

In some embodiments, scanning logical address mapping information for the dataset to identify one or more pages of the dataset that have the designated content-based signature prefix comprises identifying an address-to-hash mapping table for the dataset, and traversing the address-to-hash mapping table to identify one or more entries each including a hash value having the designated content-based signature prefix.

An example of an address-to-hash mapping table 300 for a given dataset i in an illustrative embodiment is shown in FIG. 3. The table 300 comprises a plurality of entries, each corresponding to the logical address of a different page of the dataset. In addition to the logical address of a given page, each entry comprises a hash prefix, and additional bytes of the hash of the given page. The "hash" as used in this example is considered a type of content-based signature, and the "hash prefix" denotes the designated content-based signature prefix.

The hash values in respective entries of the address-to-hash mapping table 300 may comprise at least respective portions of corresponding content-based signatures comprising hash digests of respective ones of the pages.

Additionally or alternatively, the hash values in respective entries of the address-to-hash mapping table 300 may comprise respective hash handles corresponding to respective content-based signatures of respective ones of the pages.

The address-to-hash mapping table 300 in some embodiments more particularly comprises an A2H tree or other type of A2H table configured to map page logical addresses to respective hash values. In such an arrangement, the length of the hash prefix relative to the length of the hash entries of the A2H table establishes the sampling ratio. For example, if the hash entries are each eight bytes and the hash prefix is one byte, the sampling ratio is given by a fraction $\frac{1}{256}$ of the total scan space of the A2H table.

The content-based signatures are illustratively computed for respective pages of the dataset using SHA1 or another type of secure hashing algorithm. Such a computation is assumed to be performed utilizing content-based signature computation module 114 of storage system 105 in system 100.

Other arrangements of table fields can be used, and the term "table" as used herein is intended to be broadly construed so as to encompass numerous alternative data structures for maintaining information used in generating a capacity release estimate. For example, an A2H tree or other similar tree-like data structure is considered a type of table as that term is broadly used herein.

Accordingly, the particular table configuration shown in FIG. 3 is only an example, and should not be construed as limiting in any way. Also, since the term "table" as used herein is intended to be broadly construed, a given table can be implemented using a wide variety of different data structures or other storage arrangements.

In step 206, a determination is made as to whether or not a page with the designated content-based signature prefix has been identified. If no such page has yet been identified, the process returns to step 204 via step 212 to continue scanning unscanned pages of the dataset. Otherwise the process moves to step 208. The term "unscanned page" in this context simply means that the page has not yet been scanned in conjunction with the current scan of the dataset, although it may have been previously scanned in conjunction with prior scans.

In step 208, a determination is made as to whether or not the page identified as having the designated content-based signature prefix in step 206 has a reference count equal to one. If the identified page has a reference count equal to one, the process moves to step 210, and otherwise moves to step 212.

The reference count of a given page illustratively specifies a total number of pages that have the same content-based signature and that map via that same content-based signature to the same portion of a physical storage space of the storage system. The reference count is illustratively maintained for its particular corresponding content-based signature rather than for each individual page. Such a reference count is also referred to herein as the reference count of a given page having that particular content-based signature. Each page having the same content-based signature will therefore have the same reference count.

The particular value of the reference count of the page that is utilized to control whether or not a compressibility measure is determined for that page illustratively comprises a reference count value of one. As mentioned previously, this is because an individual page having a reference count greater than one will generally not result in any capacity release if removed.

In some embodiments, the process may be modified to count, for each identified page having the designated content-based signature prefix and a reference count greater than one, the number of times that pages having that same content-based signature appear in the dataset. If the total number of times that pages having a particular content-based signature appear in the fully-scanned dataset is found to be the same as the reference count for that content-based signature, the content-based signature can be removed from the storage system in conjunction with deletion of all of its corresponding pages in the dataset. This is because under such a condition there will be no other pages with that particular content-based signature in any other datasets of the storage system.

In step 210, a compressibility measure is determined for the identified page having a reference count equal to one. The process then moves to step 212.

In some embodiments, determining a compressibility measure for the identified page comprises reading a stored compressibility measure generated in conjunction with a previous compression of that page. Alternatively, determining a compressibility measure for the page may comprise retrieving the page, compressing the page, and generating the compressibility measure based at least in part on the compressing. The compressibility measure illustratively comprises a compression ratio, although other types of compressibility measures can be used in other embodiments.

In this embodiment, compressibility measures are determined only for those pages that have the designated content-based signature prefix in their respective content-based signatures, and have reference counts that are equal to one.

In step 212, a determination is made as to whether or not there is at least one additional page remaining to be scanned in the dataset. Each page of the dataset is scanned only once in the present embodiment. If there is at least one additional page remaining to be scanned, the process returns to step 204 to select an unscanned page for scanning. Otherwise, the process moves to step 214.

In step 214, the compressibility measures of identified pages with reference counts equal to one are utilized to generate a capacity release estimate for dataset. For example, a partial capacity release estimate may be computed based at least in part on the compressibility measures of identified pages with reference counts equal to one. This computation of a partial capacity release estimate illustratively involves computing a sum of compressed page sizes for respective ones of the pages, using their respective compressibility measures.

The partial capacity release estimate is then scaled as a function of the sampling ratio to obtain the capacity release estimate for the dataset, where the sampling ratio as described above is given by the ratio of the subspace of content-based signatures defined by the prefix to the total scan space of all possible content-based signatures. For example, the partial capacity release estimate can be scaled through multiplication by an inverse of the sampling ratio. Again, other types of scaling can be used in other embodiments.

In step 216, a determination is made as to whether or not there is at least one additional dataset to be scanned to generate a capacity release estimate for that dataset. If there is at least one additional dataset to be scanned, the process returns to step 200 to identify another dataset for scanning. Otherwise, the process ends in step 218.

Figure 2:
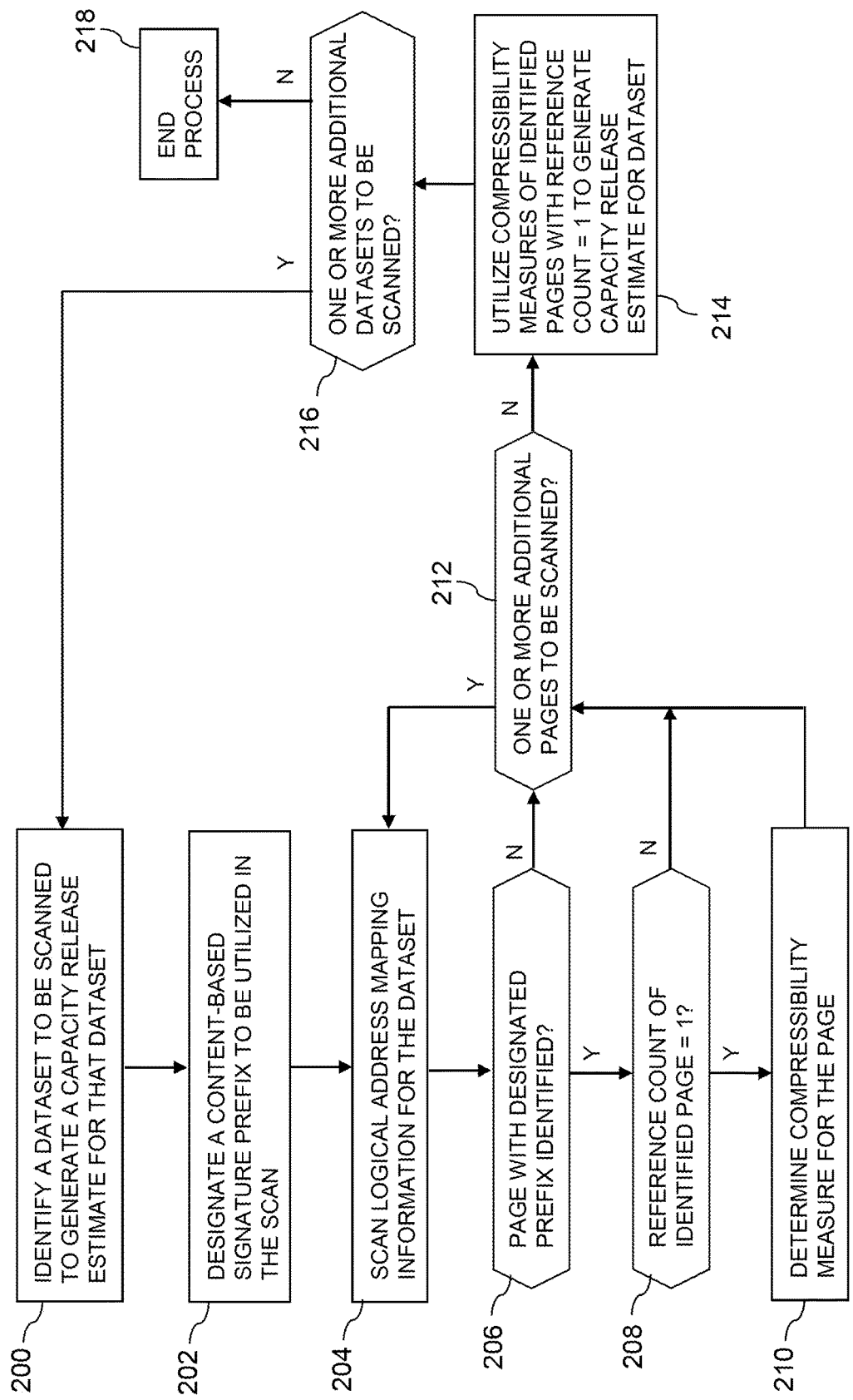
FIG. 2 is a flow diagram of a process for efficient generation of capacity release estimates for deletion of datasets in an illustrative embodiment.

The capacity release estimates generated by a storage system using the FIG. 2 process are utilized to perform one or more automated operations in the storage system. For example, the storage system may be configured to adjust one or more characteristics of a storage configuration of a given dataset based at least in part on the capacity release estimate generated for that dataset. This may include, for example, determining whether or not to delete the dataset from the storage system. As another example, adjusting one or more characteristics of a storage configuration of the given dataset may include migrating the given dataset from a relatively high performance storage tier to a relatively low performance storage tier in a multi-tier storage system. In some embodiments, the capacity release estimates are utilized in an artificial intelligence (AI) engine that controls movement of datasets between storage tiers or other storage configuration characteristics of datasets.

In some embodiments, the storage system is configured to generate multiple capacity release estimates for respective different datasets, and to select a particular one of the datasets for deletion based at least in part on their respective capacity release estimates. For example, the dataset having the highest-valued capacity release estimate may be prioritized for deletion in a storage system over other datasets having lower-valued capacity release estimates. These and numerous other automated actions may be taken utilizing capacity release estimates generated using the FIG. 2 process.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for generating capacity release estimates. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different capacity release estimation processes for respective different datasets or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 of storage system 105 that is configured to control performance of one or more steps of the FIG. 2 process in its corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate capacity release estimate generation techniques as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of the storage system 105, and accordingly is assumed to be coupled to host devices 102 of computer system 101 via network 104 within information processing system 100.

The storage controller 408 in the present embodiment is configured to implement capacity release estimate generation functionality of the type previously described in conjunction with FIGS. 1 through 3.

The storage controller 408 includes distributed modules 412 and 414, which are configured to operate in a manner similar to that described above for respective corresponding modules 112 and 114 of storage controller 108.

Figure 4:
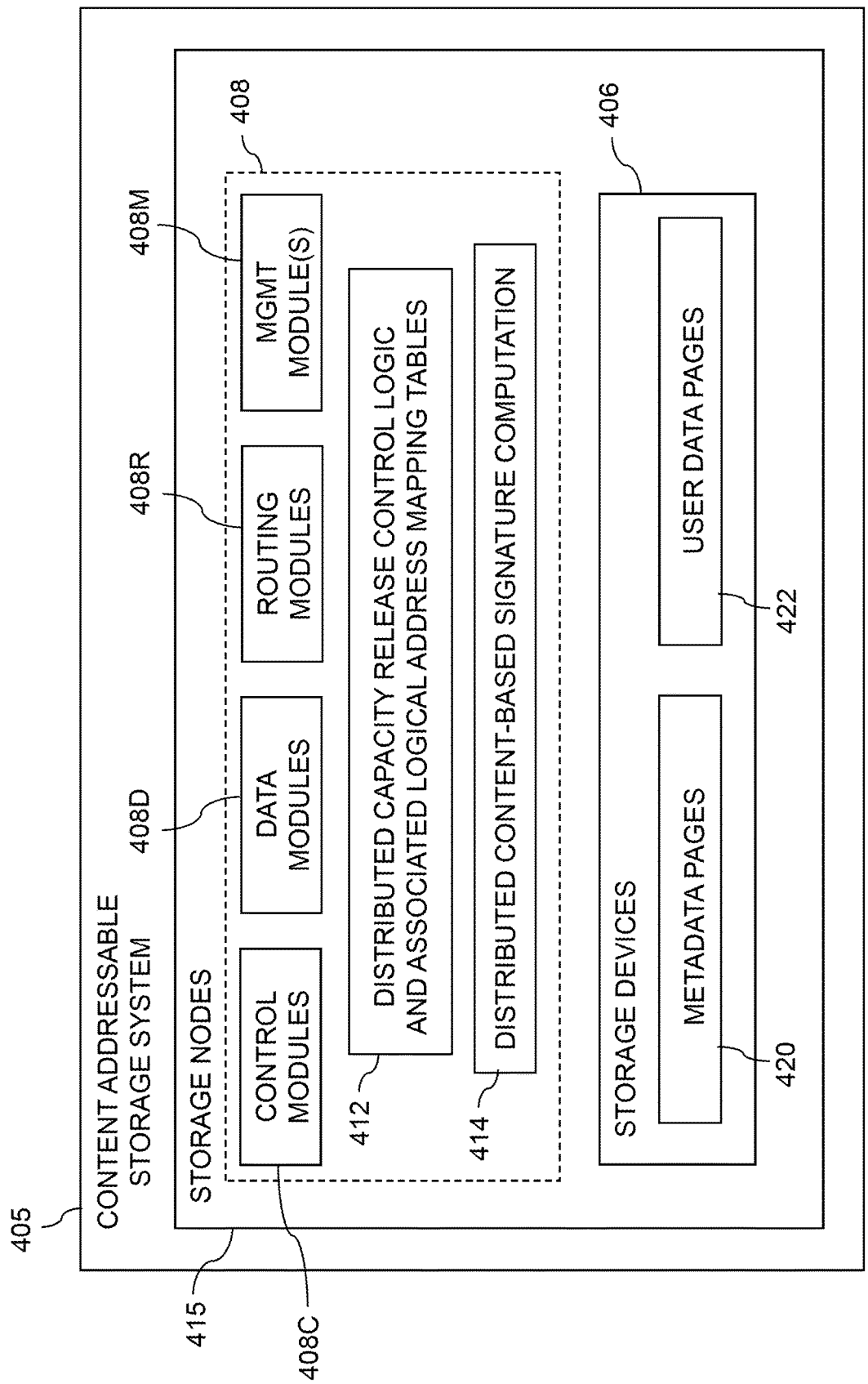
FIG. 4 shows a content addressable storage system having a distributed storage controller configured with functionality for efficient generation of capacity release estimates for deletion of datasets in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP and Transmission Control Protocol (TCP). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408.

Accordingly, at least portions of the capacity release estimate generation functionality of the modules 412 and 414 may be implemented in one or more of the other modules of the storage controller 408. In other embodiments, the modules 412 and 414 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 422 can include any type of user data that may be utilized in the system 100. The term "user data" herein is therefore also intended to be broadly construed.

A given dataset for which a capacity release estimate is generated using modules 412 and 414 illustratively comprises a set of LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generating using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The capacity release estimate generation functionality provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include capacity release control logic that engages corresponding capacity release control logic instances in all of the control modules 408C and routing modules 408R in order to implement a capacity release estimate generation process.

In some embodiments, the content addressable storage system 405 comprises an XtremIO™ storage array suitably modified to incorporate techniques for generation of capacity release estimates and performance of automated functions based at least in part on those estimates as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, capacity release estimate generation functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device, illustratively one of the host devices 102. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement capacity release estimate generation functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with capacity release estimate generation functionality as disclosed herein can provide a number of significant advantages relative to conventional arrangements.

For example, some embodiments provide techniques for efficient generation of capacity release estimates for datasets of a storage system through utilization of designated content-based signature prefixes in scanning pages of the datasets.

Illustrative embodiments can be configured to generate highly accurate capacity release estimates in a manner that does not consume excessive computational or memory resources of a storage system.

Some embodiments can be configured such that if a given content-based signature appears in the storage system only for pages in the particular dataset being scanned, the scan will be guaranteed to find all of the occurrences of that content-based signature and its corresponding pages in the sample space, thereby facilitating deletion of the particular content-based signature in conjunction with deletion of the dataset.

Some embodiments can be dynamically reconfigured to trade off performance measures such as rate of false positives with amounts of computational and memory resources consumed by the scan.

Functionality for capacity release estimate generation and associated automated processing based at least in part on the resulting capacity release estimates can be implemented in a storage system, in a host device, or partially in a storage system and partially in a host device.

These and other embodiments can considerably reduce the amounts of computational and memory resources that are required to generate capacity release estimates, thereby leading to improved dataset deletion decisions and associated improvements in system performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with capacity release estimate generation functionality will now be described in greater detail with reference to FIGS. 5 and 6. Although described in the context of system 100, these platforms may also be used to implement at least portions of other information processing systems in other embodiments.

Figure 5:
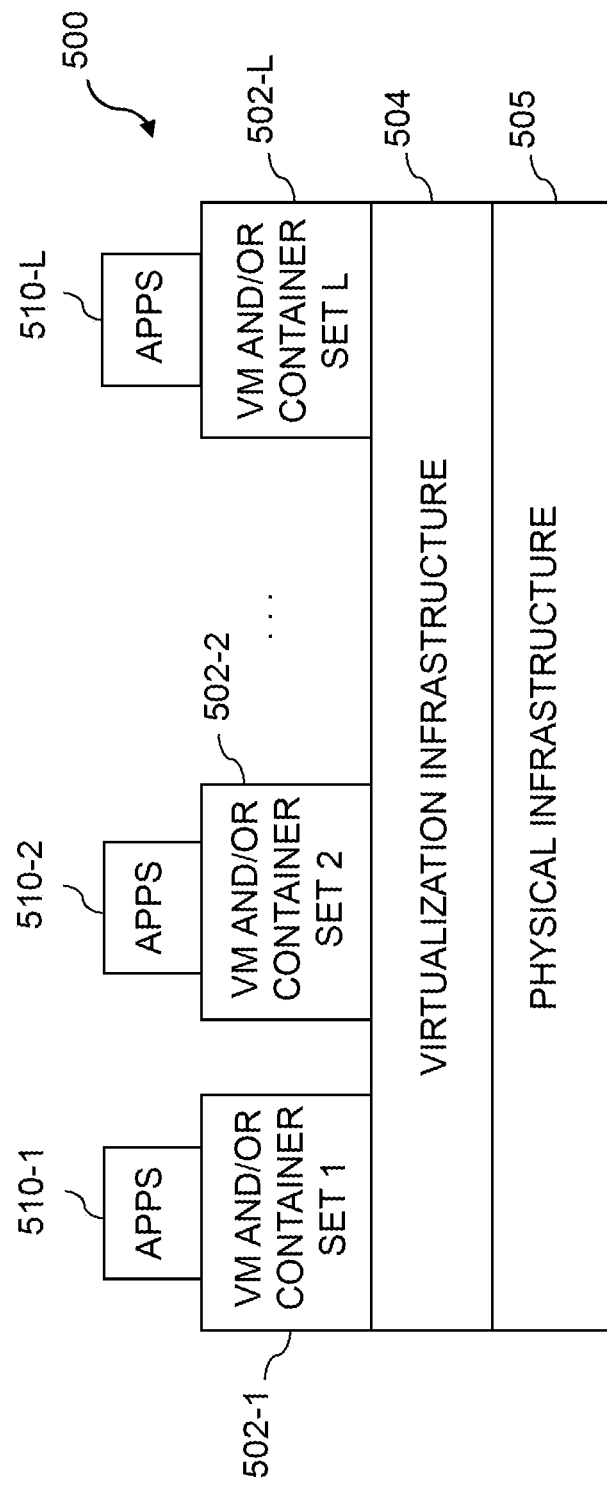
FIGS. 5 and 6 show examples of processing platforms that may be utilized to implement at least a portion of an information processing system in illustrative embodiments.
Figure 6:
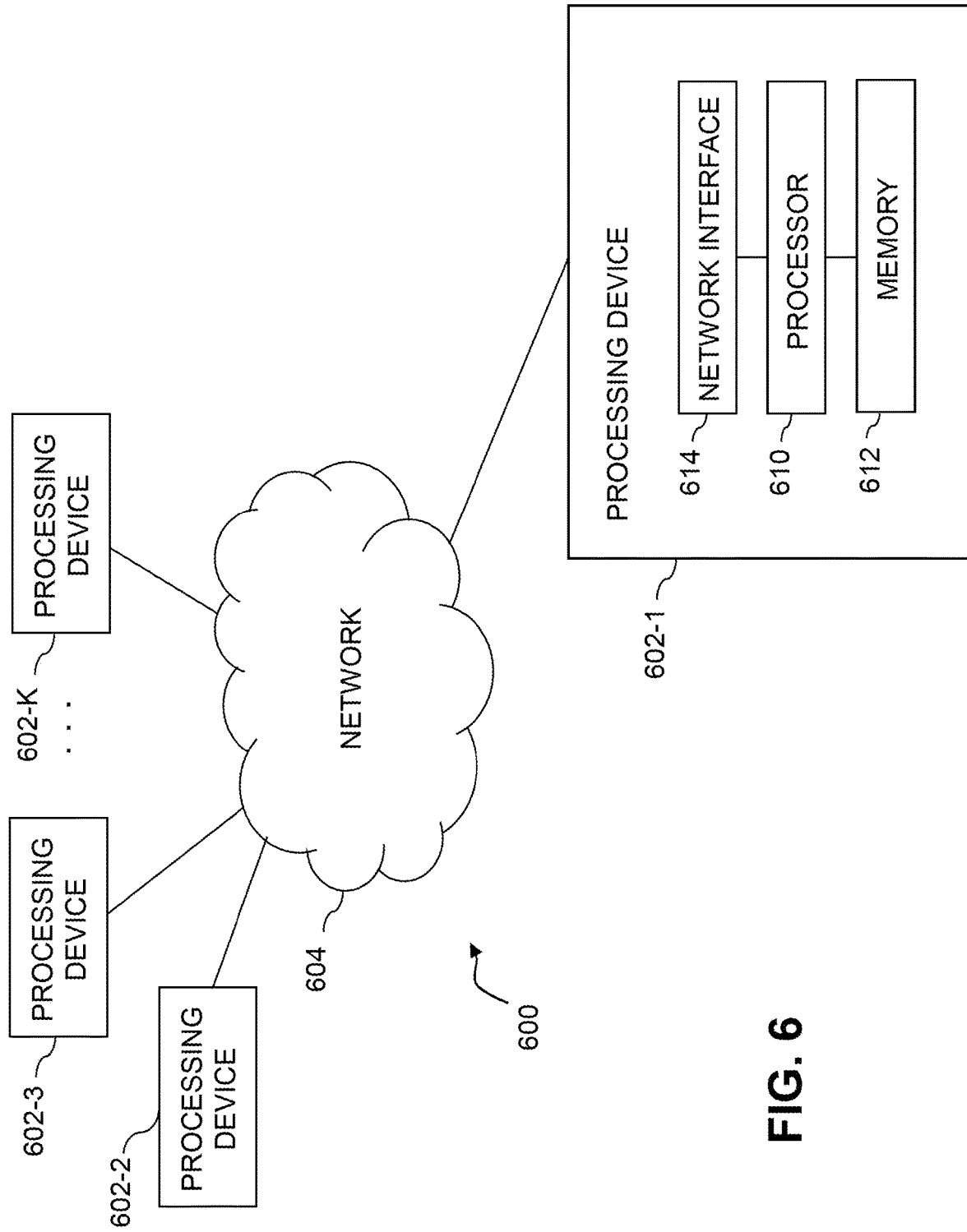

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide capacity release estimate generation functionality of the type described above for one or more processes running on a given one of the VMs. For example, each of the VMs can implement capacity release control logic and associated logical address mapping tables for providing capacity release estimate generation functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide capacity release estimate generation functionality of the type described above. For example, a container host device supporting multiple containers of one or more container sets can implement one or more instances of capacity release control logic and associated logical address mapping tables for use in generating capacity release estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the capacity release estimate generation functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, capacity release estimate generation processes and associated control logic and tables. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and an associated storage controller;
the storage controller being configured:
to identify a dataset to be scanned to generate a capacity release estimate for prospective deletion of that dataset;
to designate a content-based signature prefix to be utilized in the scan;
to scan logical address mapping information for the dataset to identify one or more pages of the dataset that have the designated content-based signature prefix, wherein the scanning further comprises, for each such identified page:
determining a reference count of the page, the reference count of the page being distinct from but maintained for a corresponding content-based signature of the page, such that pages having the same content-based signature have the same reference count; and
responsive to the reference count of the page having a particular value, determining a compressibility measure for the page; and
to generate the capacity release estimate for prospective deletion of the dataset based at least in part on the one or more page compressibility measures;
wherein the reference count of the page specifies a total number of pages that have the same content-based signature and that map via that same content-based signature to the same portion of a physical storage space of one or more of the storage devices;
wherein the particular value of the reference count of the page that is utilized to control whether or not a compressibility measure is determined for that page comprises a reference count value of one; and
wherein the storage controller comprises at least one processing device comprising a processor coupled to a memory.

2. The apparatus of claim 1 wherein the dataset comprises a particular point-in-time snapshot of a set of one or more logical storage volumes and wherein each of the logical storage volumes comprises at least a portion of the physical storage space of the one or more of the storage devices.

3. The apparatus of claim 1 wherein scanning logical address mapping information for the dataset to identify one or more pages of the dataset that have the designated content-based signature prefix comprises:
identifying an address-to-hash mapping table for the dataset; and
traversing the address-to-hash mapping table to identify one or more entries each including a hash value having the designated content-based signature prefix.

4. The apparatus of claim 3 wherein the hash values in respective entries of the address-to-hash mapping table comprise at least respective portions of corresponding content-based signatures comprising hash digests of respective ones of the pages.

5. The apparatus of claim 3 wherein the hash values in respective entries of the address-to-hash mapping table comprise respective hash handles corresponding to respective content-based signatures of respective ones of the pages.

6. The apparatus of claim 3 wherein a sampling ratio for the scan is a function of a length of the content-based signature prefix in bytes.

7. The apparatus of claim 1 wherein determining a compressibility measure for the page comprises reading a stored compressibility measure generated in conjunction with a previous compression of the page.

8. The apparatus of claim 1 wherein determining a compressibility measure for the page comprises:
retrieving the page;
compressing the page; and
generating the compressibility measure based at least in part on the compressing.

9. The apparatus of claim 1 wherein the designated content-based signature prefix comprises a specified number of initial content-based signatures bytes each having a designated value.

10. The apparatus of claim 9 wherein the content-based signature prefix comprises a single byte.

11. The apparatus of claim 1 wherein generating the capacity release estimate for the dataset based at least in part on the one or more page compressibility measures further comprises:
computing a partial capacity release estimate based at least in part on multiple page compressibility measures used to determine compressed page sizes for respective ones of the pages; and
scaling the partial capacity release estimate as a function of a sampling ratio to obtain the capacity release estimate for the dataset.

12. The apparatus of claim 1 wherein the storage controller is configured:
to generate one or more additional capacity release estimates for respective ones of one or more additional datasets; and
to select a particular one of the datasets for deletion based at least in part on their respective capacity release estimates.

13. A method comprising:
identifying in a storage system a dataset to be scanned to generate a capacity release estimate for prospective deletion of that dataset;
designating a content-based signature prefix to be utilized in the scan;
scanning logical address mapping information for the dataset to identify one or more pages of the dataset that have the designated content-based signature prefix, wherein the scanning further comprises, for each such identified page:
determining a reference count of the page, the reference count of the page being distinct from but maintained for a corresponding content-based signature of the page, such that pages having the same content-based signature have the same reference count; and
responsive to the reference count of the page having a particular value, determining a compressibility measure for the page; and
generating the capacity release estimate for prospective deletion of the dataset based at least in part on the one or more page compressibility measures;
wherein the reference count of the page specifies a total number of pages that have the same content-based signature and that map via that same content-based signature to the same portion of a physical storage space of one or more of storage devices of the storage system;
wherein the particular value of the reference count of the page that is utilized to control whether or not a compressibility measure is determined for that page comprises a reference count value of one; and
wherein the method is implemented by at least one processing device comprising a processor coupled to a memory.

14. The method of claim 13 wherein scanning logical address mapping information for the dataset to identify one or more pages of the dataset that have the designated content-based signature prefix comprises:
identifying an address-to-hash mapping table for the dataset; and
traversing the address-to-hash mapping table to identify one or more entries each including a hash value having the designated content-based signature prefix.

15. The method of claim 13 wherein the designated content-based signature prefix comprises a specified number of initial content-based signatures bytes each having a designated value.

16. The method of claim 13 further comprising:
generating one or more additional capacity release estimates for respective ones of one or more additional datasets; and
selecting a particular one of the datasets for deletion based at least in part on their respective capacity release estimates.

17. A computer program product comprising a non-transitory processor-readable storage medium having stored therein program code of one or more software programs, wherein the program code when executed by at least one processing device causes the at least one processing device:
to identify in a storage system a dataset to be scanned to generate a capacity release estimate for prospective deletion of that dataset;
to designate a content-based signature prefix to be utilized in the scan;
to scan logical address mapping information for the dataset to identify one or more pages of the dataset that have the designated content-based signature prefix, wherein the scanning further comprises, for each such identified page:
determining a reference count of the page, the reference count of the page being distinct from but maintained for a corresponding content-based signature of the page, such that pages having the same content-based signature have the same reference count; and
responsive to the reference count of the page having a particular value, determining a compressibility measure for the page; and to generate the capacity release estimate for prospective deletion of the dataset based at least in part on the one or more page compressibility measures;

wherein the reference count of the page specifies a total number of pages that have the same content-based signature and that map via that same content-based signature to the same portion of a physical storage space of one or more storage devices of the storage system; and wherein the particular value of the reference count of the page that is utilized to control whether or not a compressibility measure is determined for that page comprises a reference count value of one.

18. The computer program product of claim 17 wherein scanning logical address mapping information for the dataset to identify one or more pages of the dataset that have the designated content-based signature prefix comprises:

identifying an address-to-hash mapping table for the dataset; and traversing the address-to-hash mapping table to identify one or more entries each including a hash value having the designated content-based signature prefix.

19. The computer program product of claim 17 wherein the designated content-based signature prefix comprises a specified number of initial content-based signatures bytes each having a designated value.

20. The computer program product of claim 17 wherein the program code when executed by the at least one processing device causes the at least one processing device:

to generate one or more additional capacity release estimates for respective ones of one or more additional datasets; and to select a particular one of the datasets for deletion based at least in part on their respective capacity release estimates.

* * * * *